United States Patent [19]
Mönch

[11] Patent Number: 5,957,160
[45] Date of Patent: Sep. 28, 1999

[54] SANITARY WATER VALVE

[75] Inventor: Heiner Mönch, Kenn, Germany

[73] Assignee: Ideal-Standard GmbH, Bonn, Germany

[21] Appl. No.: 08/913,163

[22] PCT Filed: Feb. 14, 1996

[86] PCT No.: PCT/EP96/00627

§ 371 Date: Aug. 21, 1997

§ 102(e) Date: Aug. 21, 1997

[87] PCT Pub. No.: WO96/26379

PCT Pub. Date: Aug. 29, 1996

[30] Foreign Application Priority Data

Feb. 24, 1995 [AU] Australia ................................ A 344/95

[51] Int. Cl.⁶ ........................... F16K 11/074; F16K 47/02
[52] U.S. Cl. .................................. 137/625.4; 137/625.41; 137/454.6; 251/127
[58] Field of Search .......................... 137/454.2, 454.6, 137/625.41, 625.4; 251/118, 127

[56] References Cited

U.S. PATENT DOCUMENTS

| | | | |
|---|---|---|---|
| 2,751,930 | 6/1956 | Redner | 137/625.41 |
| 3,812,875 | 5/1974 | Buhler | 137/454.6 |
| 5,082,241 | 1/1992 | Orlandi | 251/127 |
| 5,113,908 | 5/1992 | Steinke | 251/127 |
| 5,161,576 | 11/1992 | Hekkert et al. | 251/127 |
| 5,176,168 | 1/1993 | Stoll et al. | 251/127 |
| 5,195,555 | 3/1993 | Knapp | 137/454.6 |
| 5,303,736 | 4/1994 | Orlandi | 251/127 |
| 5,503,182 | 4/1996 | Huang | 251/127 |
| 5,613,520 | 3/1997 | Knapp | 137/625.4 |

FOREIGN PATENT DOCUMENTS

| | | |
|---|---|---|
| 0 120 815 | 10/1984 | European Pat. Off. . |
| 26 60 898 C2 | 12/1977 | Germany . |
| 0 018 438 | 11/1980 | Germany . |

*Primary Examiner*—Denise L. Ferensic
*Assistant Examiner*—Joanne Y. Kim
*Attorney, Agent, or Firm*—Herbert Dubno

[57] ABSTRACT

In a sanitary valve, particularly a mixing valve, with a connection unit provided in a housing for connecting to the water supply lines (4) a cartridge (1) comprising the control elements, whereby the connection unit (6) is arranged in the housing and has passages for hot and cold water, the walling of the passages of the connection unit (6) having openings into which the noise mufflers can be inserted.

4 Claims, 1 Drawing Sheet

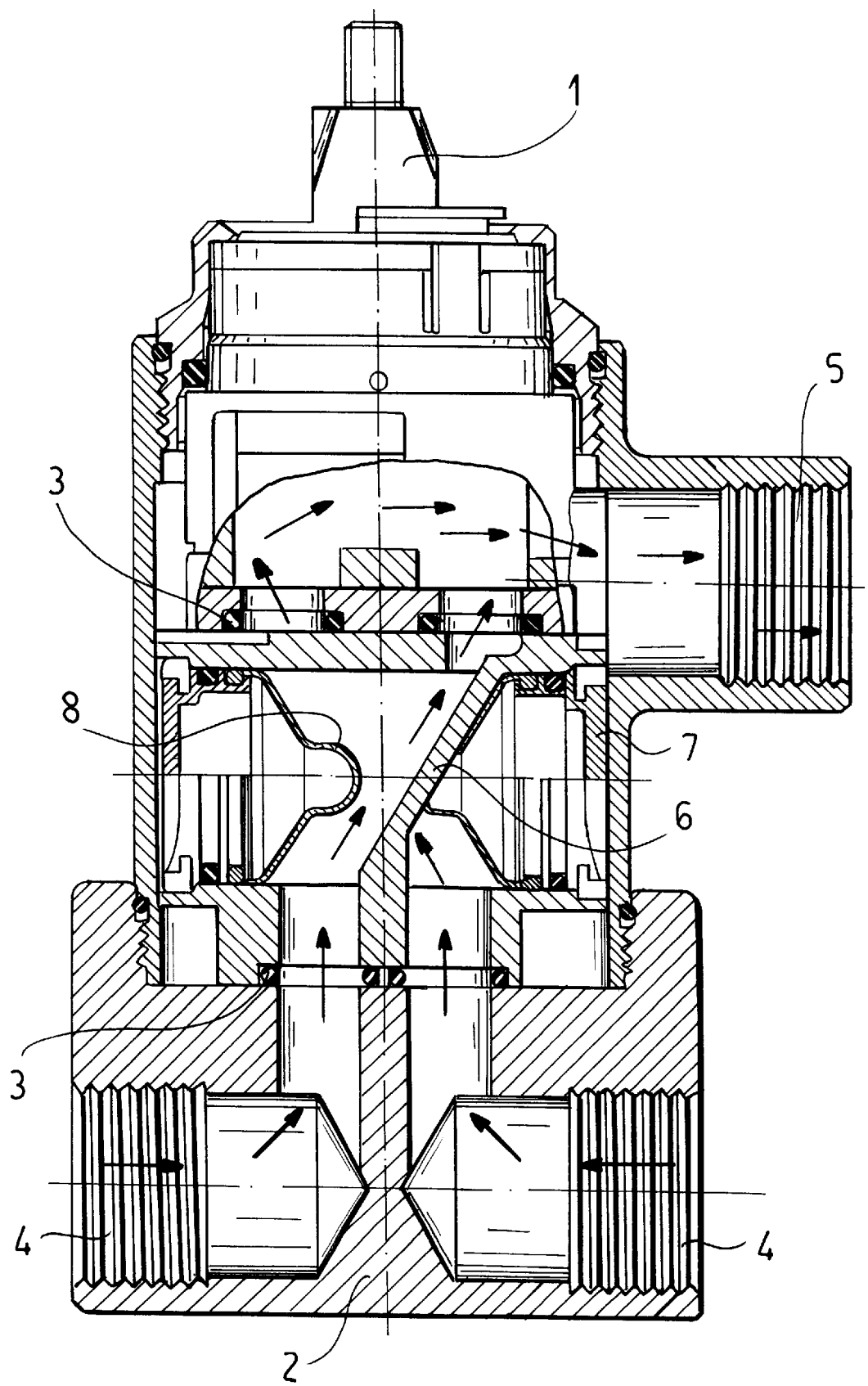

SANITARY WATER VALVE

CROSS REFERENCE TO RELATED APPLICATIONS

This application is a national stage of PCT/EP96/00627 filed Feb. 14, 1996 which is, in turn, based upon Austrian National Application A 344/95 filed Feb. 24, 1995 under the International Convention.

FIELD OF THE INVENTION

The present invention relates to a sanitary water fixtures consisting mainly of a basic body, designed to be concealed or surface mounted, a cartridge mounted on the basic body and a housing, as well as one or more operating handles which are in engagement with the cartridge and in under certain conditions also secure the housing in its position.

The present invention relates, more particularly, to a sanitary water valve, especially a mixing valve, with a connection unit for the connection to the water supply lines and with a cartridge, located in the housing and receiving the control elements, whereby the connection unit is located in the housing and has passages for the hot and cold water. According to the invention the walls of the passages of the connection unit have openings into which noise mufflers can be inserted.

BACKGROUND OF THE INVENTION

When valves of sanitary fixtures are suddenly closed or opened, considerably loud noises can be produced. Since in many countries noise pollution regulations require a low noise level, many attempts have been already made to develop water noise mufflers to be built into sanitary systems. So for instance it is known to insert into a pipe an insert of an elastic material, namely in a support ring.

From WO 89/01585 a mixing valve is known, wherein in one of the cartridge valve plates a flow guiding piece is inserted. Naturally for this purpose the size of the passages in the valve plates have to be suitably selected.

In the fixture according to CH-A-628 967 a damper precedes the valve whereby the water flow is turned on and off. The damper is made in one piece from a permanently elastic material and has passages. It is built into a blind bore in the housing and the supply lines for cold and hot water have to be correspondingly connected with the passages, i.e. the connection geometry has to be specially fitted for these arrangements.

OBJECT OF THE INVENTION

It is the object of the present invention to provide a valve of the type described with sound damping, without having to change the cartridge elements or the connections of the fixture.

SUMMARY OF THE INVENTION

According to the invention, the walling of the passages of the connection unit have openings into which noise mufflers are inserted. In this way neither the cartridge nor connection geometry of the fixture has to be modified. If the noise muffler is mounted in the direct water flow in the case of concealed fixtures, then brass can be saved on the basic body, since no additional bores have to be provided, because the noise mufflers are inserted into the walls, i.e. into the water path to the cartridge.

DESCRIPTION OF THE DRAWING

The above and other objects, features, and advantages will become more readily apparent from the following description, reference being made to the accompanying drawing, the sole FIGURE of which is a cross sectional view of a valve according to the invention.

SPECIFIC DESCRIPTION

The mixing valve has a conventional construction, namely, a valve body 2 with inlets 4 and outlet 5, wherefrom the water is then supplied to a usual dispensing location, for instance to a tub spigot or a shower. For the control of the water flows a cartridge 1 is provided, which can be connected with operating handles by means of which the delivery of cold and hot water can be controlled. The construction of such a cartridge is generally known and does not need to be repeated. One or more noise mufflers 8 held by a connection unit 6 are provided in the water path. Further a muffler support 7 is provided and seals 3 are provided at the connection points between individual components.

In the conventional construction, especially in the case of concealed fixtures, the noise mufflers 8 are located between the concealed basic body and the water supply lines 4. This increases the overall dimensions, which in turn requires larger concealed boxes, and thereby also larger rosettes. This is avoided by the present invention. In the case of concealed fixture the overall dimensions are smaller, and therefore the covering rosettes can also be smaller. It is also advantageous that the invention can be used also for noise problems in installed bodies, which means that the invention is suitable for retrofitting.

A mixup in the water paths, namely from cold to hot, respectively vice versa, which sometimes occurs due to the negligence of the plumbers, would no longer matter. Due to the invention through simple changes of the insertions receiving the noise mufflers and by corresponding displacement of the water ways, e.g. diagonal position of the inner walling, hot and cold can be interchanged, so that even in defective installations a normal connection of the water flows to the cartridge and thereby the correct water flow, can be re-established. The advantage resides in the fact that it offers a normal operability of the water valve, particularly also in mixing valves.

Due to the invention it is also possible to save on noise-muffled S connections in surface mounted fixtures.

The noise muffling is also insured when using the old, S-connections without noise muffling, for instance in remodelling, whereby it is not necessary to disassemble the installation when for the fitting of the cartridge to the basic body a connection unit is used which can accommodate the sound mufflers. The connection unit can be a brass component and can have openings for receiving the sound mufflers in the water passages leading to the cartridge, however the mufflers can also be arranged in a separate piece which is insertable in the connection unit. As shown in the drawing, the connection unit and the connection piece can also be made in one piece. In this way in remodelling cases it is not necessary to disassemble or to exchange the S-connections, so that no damage can occur at the connections, even in these old fixtures.

According to the invention the noise mufflers are easily exchangeable, since no disassembling at the S-connections has to take place.

The connection piece or the entire connection unit can be made of plastic material, so that cost-effective manufacturing is possible.

It can be conceived to apply the invention also to thermostatic valves. In thermostatic valves closable S-connections are provided in surface-mounted versions, so that there is no room for noise mufflers, however the invention can be correspondingly applied, by providing them upstream of the thermostat control unit.

I claim:

1. A mixing valve for a sanitary fixture comprising:

a valve housing having a pair of water inlets and a water outlet;

a control cartridge received in said housing and operable to mix water arriving from said inlets and to controllably discharge water from said outlet, said housing having water passages connecting said inlets with said cartridge;

an insert received in said housing between said passages and said cartridges and formed with openings in walls of said insert along paths of water through said insert connecting said passages with said cartridge; and noise mufflers in said openings damping noise generated by the valve.

2. The mixing valve defined in claim 1 wherein said noise mufflers are held in a connection piece received in said insert.

3. The mixing valve defined in claim 1 wherein said insert is formed in one piece and said noise mufflers are received therein.

4. The mixing valve defined in claim 1, further comprising seals between said cartridge and said insert and between each of said passages and said insert.

* * * * *

UNITED STATES PATENT AND TRADEMARK OFFICE
CERTIFICATE OF CORRECTION

PATENT NO. : 5,957,160
DATED : 28 September 1999
INVENTOR(S) : Heiner MÖNCH

It is certified that error appears in the above-identified patent and that said Letters Patent is hereby corrected as shown below:

Title page, item [30] for "[AU] Australia" read
        -- [AT] Austria --.

Signed and Sealed this

Sixth Day of June, 2000

*Attest:*

Q. TODD DICKINSON

*Attesting Officer*      *Director of Patents and Trademarks*